US009361938B1

(12) United States Patent
Selvaraj (10) Patent No.: US 9,361,938 B1
(45) Date of Patent: Jun. 7, 2016

(54) DISK DEFECT MANAGEMENT FOR A DATA STORAGE DEVICE (71) Applicant: Western Digital Technologies, Inc., Irvine, CA (US)

(72) Inventor: Gomez S. Selvaraj, Anaheim, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/737,822

(22) Filed: Jun. 12, 2015

Related U.S. Application Data (60) Provisional application No. 62/148,683, filed on Apr. 16, 2015.

(51) Int. Cl.
*G11B 27/36* (2006.01)
*G11B 5/09* (2006.01)
*G11B 20/18* (2006.01)
*G11B 20/12* (2006.01)

(52) U.S. Cl.
CPC ........ *G11B 20/1889* (2013.01); *G11B 20/1252* (2013.01)

(58) Field of Classification Search
CPC ........... G11B 27/3027; G11B 2220/90; G11B 2220/30; G11B 5/012; G11B 27/36; G11B 5/09; G11B 7/007; G11B 19/04; G11B 20/1883
USPC .............. 360/31, 40, 48, 53; 369/53.1, 53.14, 369/53.15, 53.17, 53.21, 53.12, 53.24
See application file for complete search history.

(56) References Cited

U.S. PATENT DOCUMENTS

| | | | |
|---|---|---|---|
| 5,088,081 A * | 2/1992 | Farr | G06F 3/0601 360/24 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |

(Continued)

*Primary Examiner* — Nabil Hindi (57) ABSTRACT

A Data Storage Device (DSD) includes at least one disk surface for storing data and a memory for storing a bitmap buffer. A segment of a disk surface is identified that includes at least one defect region, and a segment bitmap is generated for the segment indicating the at least one defect region within the segment. The segment bitmap is stored in the bitmap buffer.

23 Claims, 8 Drawing Sheets

(56) References Cited

U.S. PATENT DOCUMENTS

| | | |
|---|---|---|
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,265 B2 | 9/2005 | Hetzler et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |

(56) References Cited

U.S. PATENT DOCUMENTS

| | | |
|---|---|---|
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,203,139 B2 * | 4/2007 | Terada ............... G11B 7/00375 369/47.14 |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,502,284 B2 | 3/2009 | Ihde |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,991,949 B2 * | 8/2011 | Gabryjelski ...... G11B 20/00086 369/47.1 |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |

(56) References Cited

U.S. PATENT DOCUMENTS

| | | |
|---|---|---|
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

\* cited by examiner

DISK DEFECT MANAGEMENT FOR A DATA STORAGE DEVICE

CROSS-REFERENCE TO RELATED APPLICATIONS

This application claims priority to provisional U.S. Patent Application Ser. No. 62/148,683, filed on Apr. 16, 2015, which is hereby incorporated by reference in its entirety.

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk, such as in a Hard Disk Drive (HDD).

Certain portions of a disk surface may have defects that prevent reliable storage of data in that location on the disk surface. The defects can include primary defects (i.e., P defects) that are identified during a manufacturing process of the DSD or grown defects (i.e., G defects) that appear in the field during operation of the DSD. These defects are typically "mapped out" using a defect map so that the defective locations on the disk surface are no longer available for storing data.

As the storage capacity of DSDs increases, the size of the defect map for the DSD also typically increases, which can reduce the overall storage capacity available to a user of the DSD. In addition, the processing time for larger defect maps is increased.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
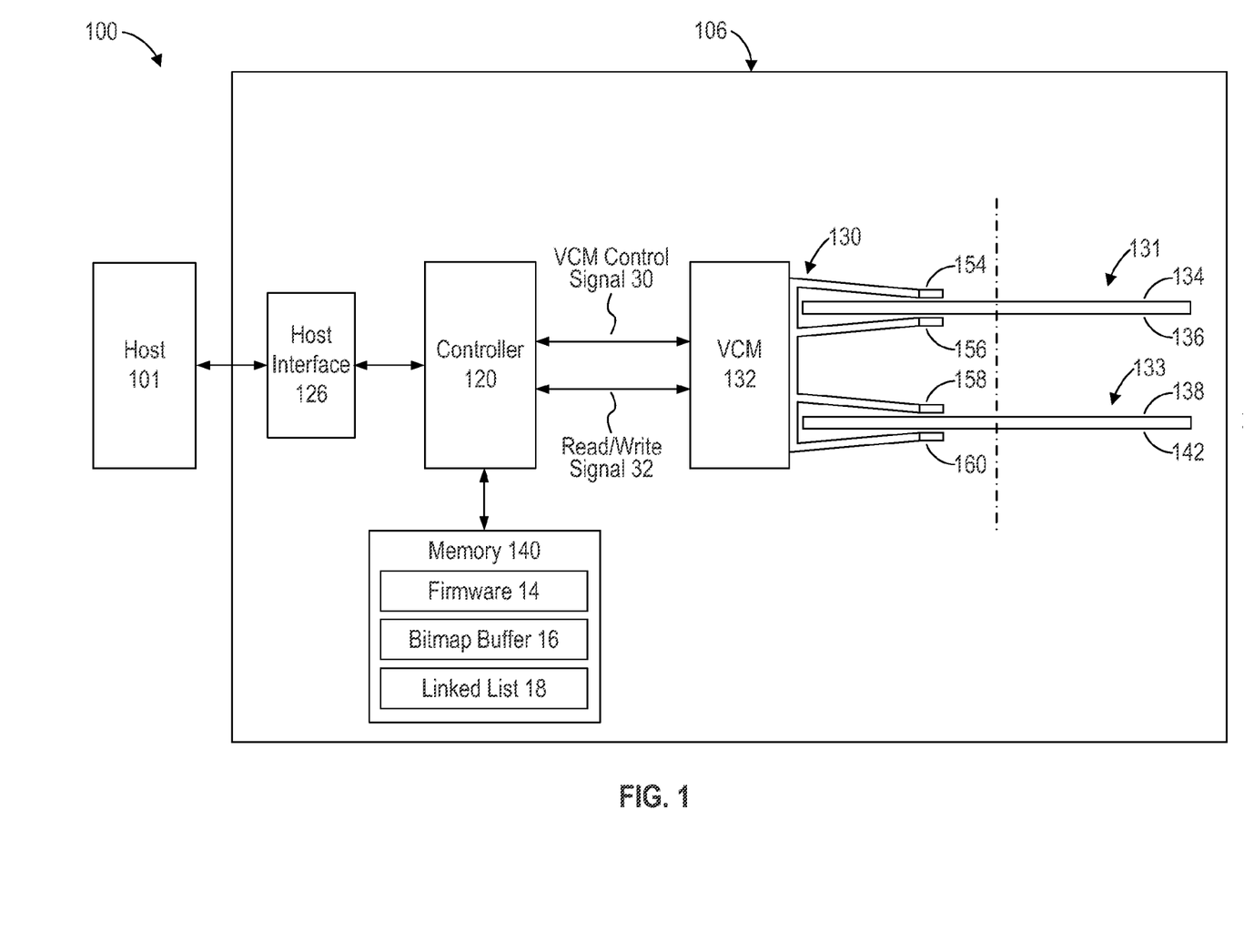
FIG. 1 is a block diagram depicting a system with a Data Storage Device (DSD) according to an embodiment.

FIG. 1 shows system 100 according to an embodiment which includes host 101 and Data Storage Device (DSD) 106. System 100 can be, for example, a computer system (e.g., server, desktop, mobile/laptop, tablet, smartphone, etc.) or other electronic device such as a Digital Video Recorder (DVR). In this regard, system 100 may be a stand-alone system or part of a network, such as a local or wide area network, or the Internet.

Those of ordinary skill in the art will appreciate that system 100 can include more or less than those elements shown in FIG. 1 and that the disclosed processes can be implemented in other environments As shown in the example embodiment of FIG. 1, DSD 106 includes Non-Volatile Memory (NVM) in the form of rotating magnetic disks 131 and 133. In other embodiments, DSD 106 may include a different number of disks or a different type of NVM such as a solid-state memory in addition to rotating magnetic disks.

DSD 106 includes controller 120 which includes circuitry such as one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a system on a chip (SoC).

Host interface 126 is configured to interface DSD 106 with host 101 and may interface according to a standard such as, for example, Serial Advanced Technology Attachment (SATA), PCI express (PCIe), Small Computer System Interface (SCSI), or Serial Attached SCSI (SAS). As will be appreciated by those of ordinary skill in the art, host interface 126 can be included as part of controller 120. Although FIG. 1 depicts the co-location of host 101 and DSD 106, in other embodiments the two need not be physically co-located. In such embodiments, DSD 106 may be located remotely from host 101 and connected to host 101 via a network interface.

In the example of FIG. 1, disks 131 and 133 form a disk pack that is rotated by a spindle motor (not shown) and heads 154, 156, 158, and 160 are positioned to read and write data on a corresponding disk surface of disks 131 or 133. Each of disk surfaces 134, 136, 138, and 142 includes a number of radially spaced, concentric tracks for storing data. In more detail, heads 154, 156, 158, and 160 are connected to the distal end of actuator 130 which is rotated by Voice Coil Motor (VCM) 132 to position heads 154, 156, 158, and 160 over tracks on disk surfaces 134, 136, 138, and 142, respectively. Controller 120 can include servo control circuitry (not shown) to control the rotation of disks 131 and 133, and control the position of the heads using VCM control signal 30.

Figure 2:
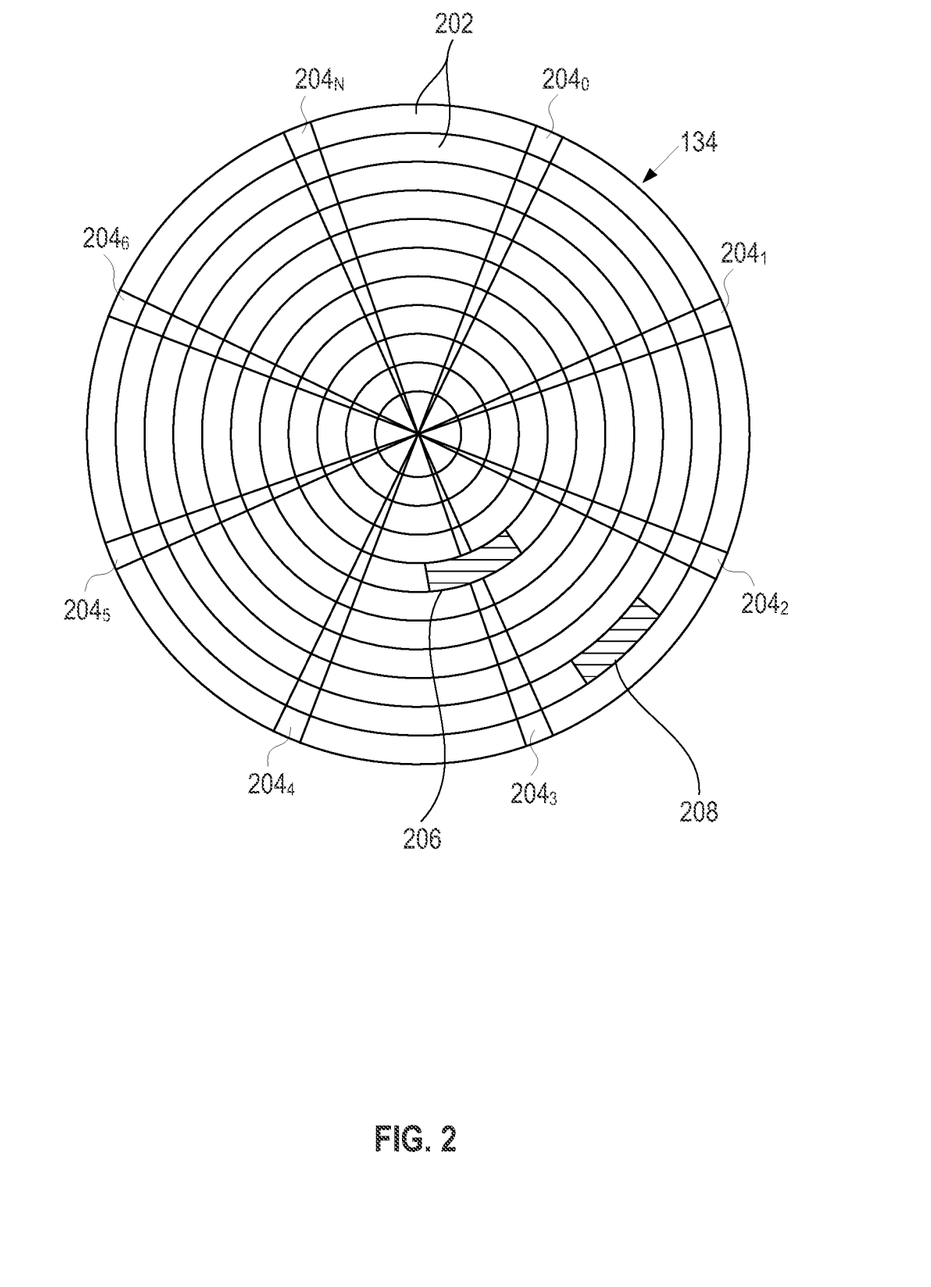
FIG. 2 illustrates a disk surface of the DSD of FIG. 1 according to an embodiment.

FIG. 2 provides an example of disk surface 134 with concentric tracks 202 and servo wedges 204 that are used to control the position of head 154 in relation to disk surface 134. Each servo wedge 204 may include servo information that can be read from disk surface 134 by head 154 to determine the position of head 154 over disk surface 134. For example, each servo wedge may include a pattern of alternating magnetic transitions (a servo burst), which may indicate a particular wedge number on disk surface 134.

FIG. 2 also depicts defect regions 206 and 208 which can include primary defects (i.e., P defects) that are identified during a manufacturing process of DSD 106 and grown defects (i.e., G defects) that appear in the field during operation of DSD 106. As discussed in more detail below, controller 120 can identify segments of a disk surface such as disk surface 134 including defect regions such as defect regions 206 and 208 and generate a segment bitmap for the segment indicating the defect regions within the segment.

By using segment bitmaps to identify only the segments of the disk surface that actually include defect regions, it is ordinarily possible to reduce the size of a defect mapping for the disk surface or to have a higher resolution for mapping defects. For example, a DSD with only enough memory (e.g., Dynamic Random Access Memory (DRAM)) to indicate whether a track has a defect may be able to increase the resolution of its defect mapping to instead indicate whether certain sectors within a track have a defect while using the same or less memory to store its defect map. In addition to improving the resolution of defect mapping, a smaller segment bitmap representing only a segment of the disk surface can be processed or searched quicker, which may allow for simultaneous defect processing for different disk surfaces. Such parallel processing of defect maps for different disk surfaces may allow for better visibility of defect patterns that can occur on different disk surfaces.

Returning to FIG. 1, memory 140 of DSD 106 is configured to store firmware 14, bitmap buffer 16, and linked list 18. In some implementations, memory 140 can be a volatile memory such as DRAM with copies of firmware 14, bitmap buffer 16, and linked list 18 stored in an NVM such as on disks 131 or 133 or in another NVM of DSD 106.

Firmware 14 includes computer executable instructions for execution by controller 120 in operating DSD 106. As discussed in more detail below with reference to FIG. 3, bitmap buffer 16 can be used by controller 120 to store segment bitmaps that indicate defect regions on a disk surface of DSD 106. Linked list 18 can be a doubly linked list that includes entries with location information for segments of the disk surfaces having at least one defect region and addresses for accessing corresponding segment bitmaps for the segments. As discussed in more detail below, the use of linked list 18 can ordinarily facilitate a more efficient processing of the segment bitmaps to improve defect management and the visibility of defects and defect patterns using location information provided in linked list 18. An example of linked list 18 is discussed below with reference to FIG. 4.

Example Defect Data Structures

Figure 3:
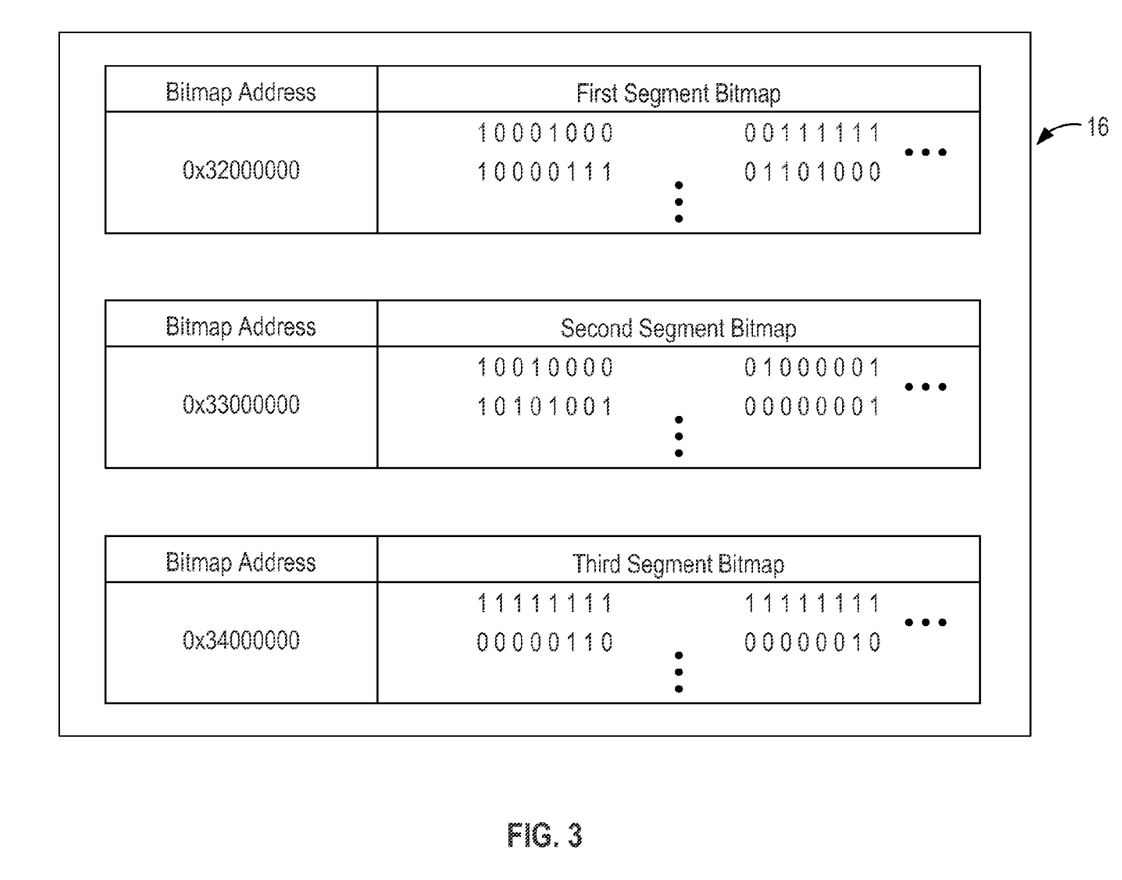
FIG. 3 depicts a bitmap buffer storing segment bitmaps according to an embodiment.

FIG. 3 depicts an example of bitmap buffer 16 storing segment bitmaps according to an embodiment. As shown in FIG. 3, bitmap buffer 16 stores three segment bitmaps (i.e., the first, second and third segment bitmaps) mapping defects in three different segments of one or more disk surfaces (e.g., disk surfaces 134, 136, 138, and 142 in FIG. 1) with each segment including at least one defect region (e.g., defect region 206 or 208 in FIG. 2).

The size of each segment may vary based on the size and location of the defect regions in the segment and a resolution used to determine the size of the segments. For example, one segment may include only a single track while another segment may include over ten contiguous tracks such as 60 tracks. The resolution for determining whether to include multiple defect regions into a single segment may depend on factors such as a size allocated to bitmap buffer 16 and/or a resolution for defect mapping. A segment size may be determined, for example, using a track based resolution where a segment would include a track with a defect and any adjacent tracks having a defect. In another implementation, a segment size may be determined using a sector based or wedge based resolution such that a segment would include a sector with a defect or a portion of a track between two servo wedges (i.e., a wedge portion) with a defect plus any adjacent sectors or wedge portions also having a defect. As discussed in more detail below with reference to the defect identification process of FIG. 7, the segment may grow as new defects are identified in adjacent tracks, sectors, or wedge portions.

In the example of FIG. 3, each of the three segment bitmaps provides a binary defect status for a particular portion of the segment. In the example of FIG. 3, a "1" can indicate a defect in the portion of the segment and a "0" can indicate no defect in the portion of the segment. Other implementations may reverse these indications so that a "1" indicates no defect and a "0" indicates a defect.

In some implementations, the portion of the segment can be a portion of a track between two servo wedges (e.g., servo wedges 204 in FIG. 2) such that each "1" or "0" provides a defect status for a different portion of a track in the segment that is between two servo wedges. In other implementations, the portion of the segment can be a particular sector in a track such that each "1" or "0" in the segment bitmap provides a defect status for each sector in the segment. The segment bitmaps are arranged in an order to correspond to or map the physical locality of defect regions in the segment. For example, in the first segment bitmap, each eight bit line can correspond to a track in a first segment of a disk surface with each "1" or "0" in the line corresponding to a defect status for a sector in the track. A first track represented by the eight bit line in the upper left of the first segment bitmap would then have a defect in the first and fifth sectors of the track.

Each group of one or more contiguous defects can be referred to as a defect region in the segment. Since defects tend to occur more frequently in particular segments or portions of a disk surface, the size of a defect map such as a bitmap can usually be reduced by only generating and storing a defect map for the segments of the disk surface that include defect regions.

In addition, each segment bitmap in the example bitmap buffer 16 of FIG. 3 is addressed with a bitmap address indicating a storage location in memory 140 for the segment bitmap. As discussed below with reference to FIG. 4, the bitmap addresses are used in entries of linked list 18 to access the bitmaps.

Figure 4:
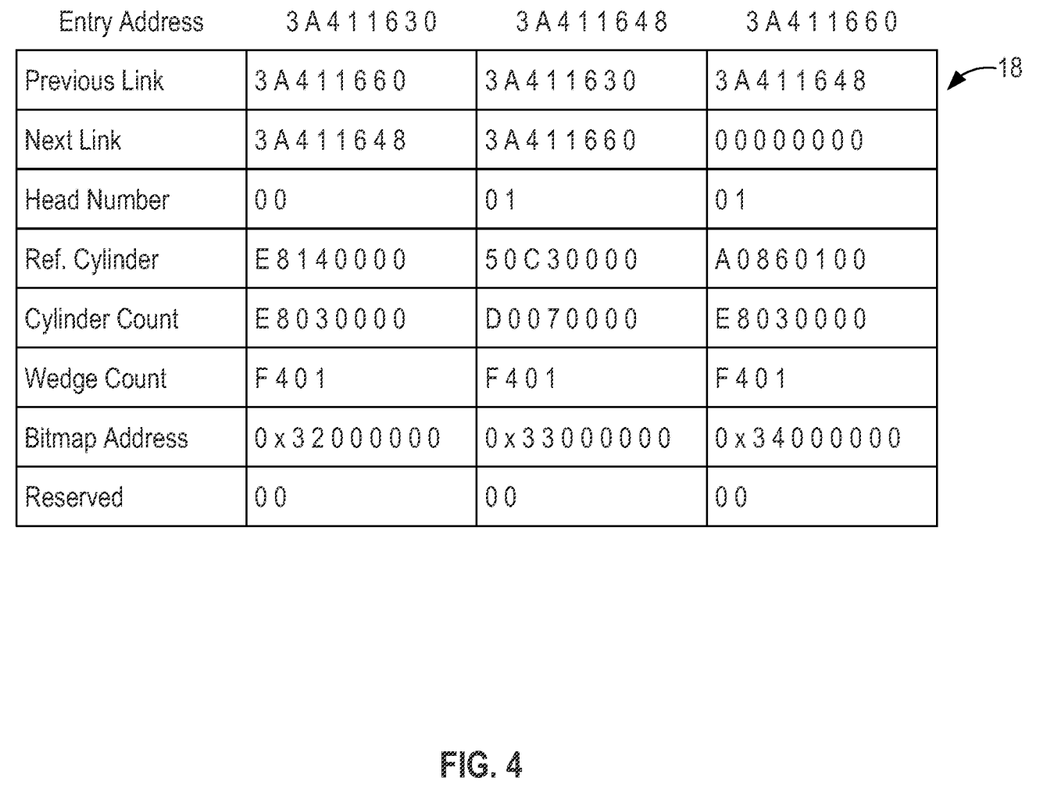
FIG. 4 depicts a doubly linked list with entries corresponding to segments on a disk surface including at least one defect region according to an embodiment.

FIG. 4 depicts an example of linked list 18 with entries associated with the segment bitmaps shown in FIG. 3. Each of the three entries of linked list 18 shown in FIG. 4 corresponds to a segment on a disk surface including at least one defect region. As shown in FIG. 4, each entry has an entry address (e.g., 3A411630, 3A411648, 3A411660) indicating a storage location in memory 140 for the entry. In the example of FIG. 4, linked list 18 is a doubly linked list such that each entry refers to a previous link and a next link in the list. This is shown in each entry of FIG. 4 with an address for a previous entry as a previous link and an address for a next entry as a next link. By including addresses for both a previous entry and a next entry, linked list 18 can be searched in either direction for a particular portion of a disk surface as discussed below in more detail with reference to FIG. 8.

In the example of FIG. 4, each entry of linked list 18 includes location information for a segment indicating a location of the segment and an address for accessing a segment bitmap for the segment. As shown in FIG. 4, a bitmap address is provided for each entry that indicates a location in memory 140 where a corresponding segment bitmap is stored for the segment.

The location information shown in FIG. 4 includes a head number, reference cylinder (i.e., track), a cylinder count, and a wedge count. The head number indicates a disk surface (e.g., one of disk surfaces 134, 136, 138, or 142 in FIG. 1) where the segment is located or similarly a head (e.g., head 154, 156, 158, or 160 in FIG. 1) that accesses data from the segment. A reference cylinder is also provided to indicate a starting track for the segment. Each entry also includes a cylinder count indicating a number of tracks in the segment and a wedge count indicating a number of wedges in the segment. In other implementations, the location information used in linked list 18 may differ.

As discussed in more detail below, the location information of the entries in linked list 18 can be used to determine a defect status for a particular portion of a disk surface or to update the segment bitmaps for the disk surfaces.

Example Defect Management Processes

Figure 5:
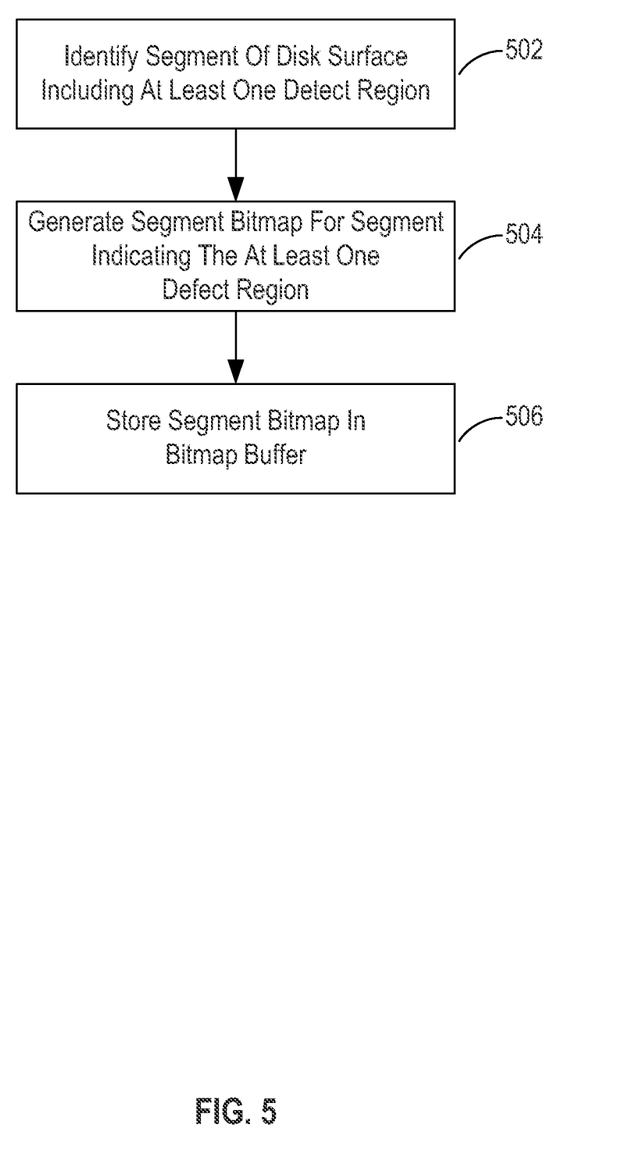
FIG. 5 is a flowchart for a defect identification process according to an embodiment.

FIG. 5 is a flowchart for a defect identification process that can be performed by controller 120 executing firmware 14 according to an embodiment. In block 502, controller 120 identifies a segment of a disk surface (e.g., one of disk surfaces 134, 136, 138, and 142) including at least one defect region. The identification of the segment may be made during a factory testing process and/or during operation of DSD 106 in the field. A defect region such as one or more sectors in a track or one or more portions of a track between servo wedges 204 can be identified when attempting to write or read data in the defect region. In the case of a primary or P defect identified during a factory test process, controller 120 may scan the disk surface for errors to identify defect regions. In the case of a grown or G defect identified during operation in the field, controller 120 may encounter repeated read or write errors for a particular sector or portion of a disk surface and then identify the sector or portion as a defect region.

In block 504, controller 120 generates a segment bitmap (e.g., the segment bitmaps shown in FIG. 3) for the segment identified in block 502. The segment bitmap indicates the at least one defect region within the segment. As discussed above, the segment bitmap can identify a location of one or more defective sectors or wedge portions that are defective.

In block 506, controller 120 stores the segment bitmap in bitmap buffer 16 in memory 140. As discussed in more detail below, the segment bitmap can be used to update the defect mapping for the disk surfaces or to determine a defect status of a particular portion of a disk surface.

Figure 6:
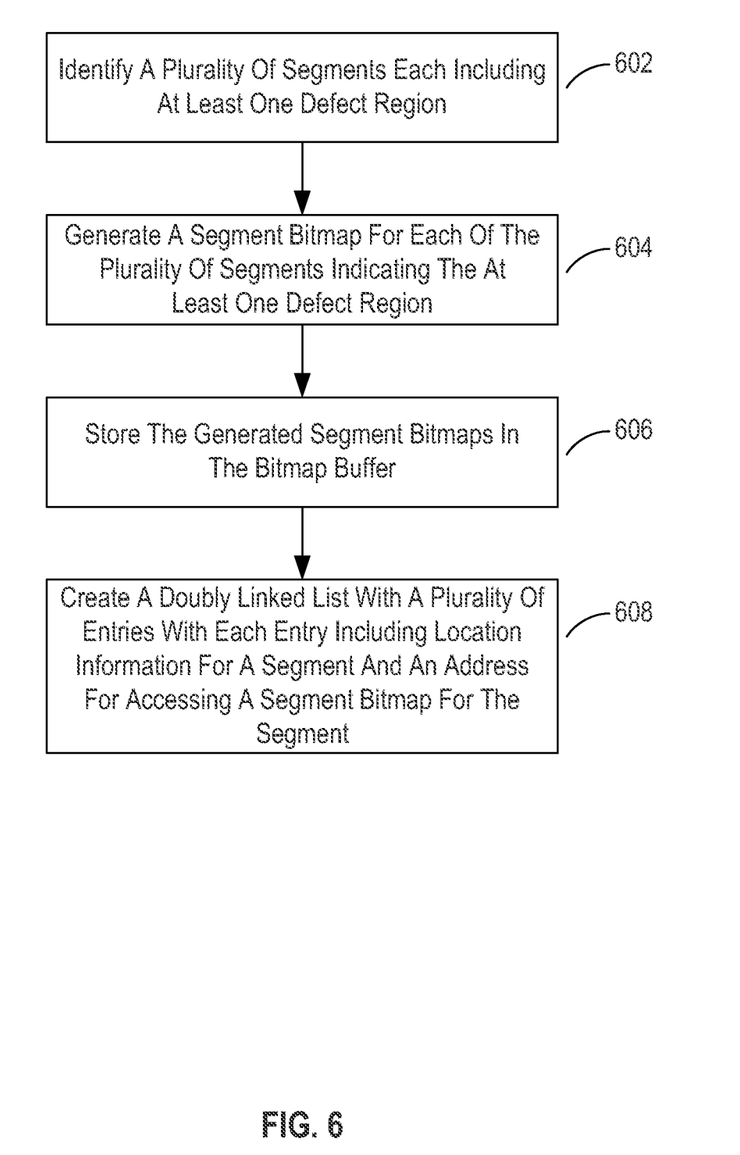
FIG. 6 is a flowchart for another defect identification process according to an embodiment.

FIG. 6 is a flowchart for another defect identification process that can be performed by controller 120 executing firmware 14 according to an embodiment. In block 602, controller 120 identifies a plurality of segments that each has at least one defect region. As discussed above with reference to block 502 of FIG. 5, the identification of the segments including defect regions may be made during a factory testing process (for P defects) and/or during operation of DSD 106 in the field (for G defects).

In block 604, controller 120 generates a segment bitmap (e.g., the segment bitmaps shown in FIG. 3) for each of the plurality of segments to indicate a location for the defect regions in the segments. As discussed above with reference to FIG. 3, the segment bitmaps may indicate a defect in a particular sector or wedge portion with a "1" and no defect in a particular sector or wedge portion with a "0."

In block 606, the segment bitmaps generated in block 604 are stored in bitmap buffer 16. In block 608, controller 120 creates linked list 18 with an entry for each segment including location information for the segment and an address for accessing a segment bitmap for the segment in bitmap buffer 16. Linked list 18 can be used by controller 120 to access a segment bitmap for a portion of a disk surface.

Figure 7:
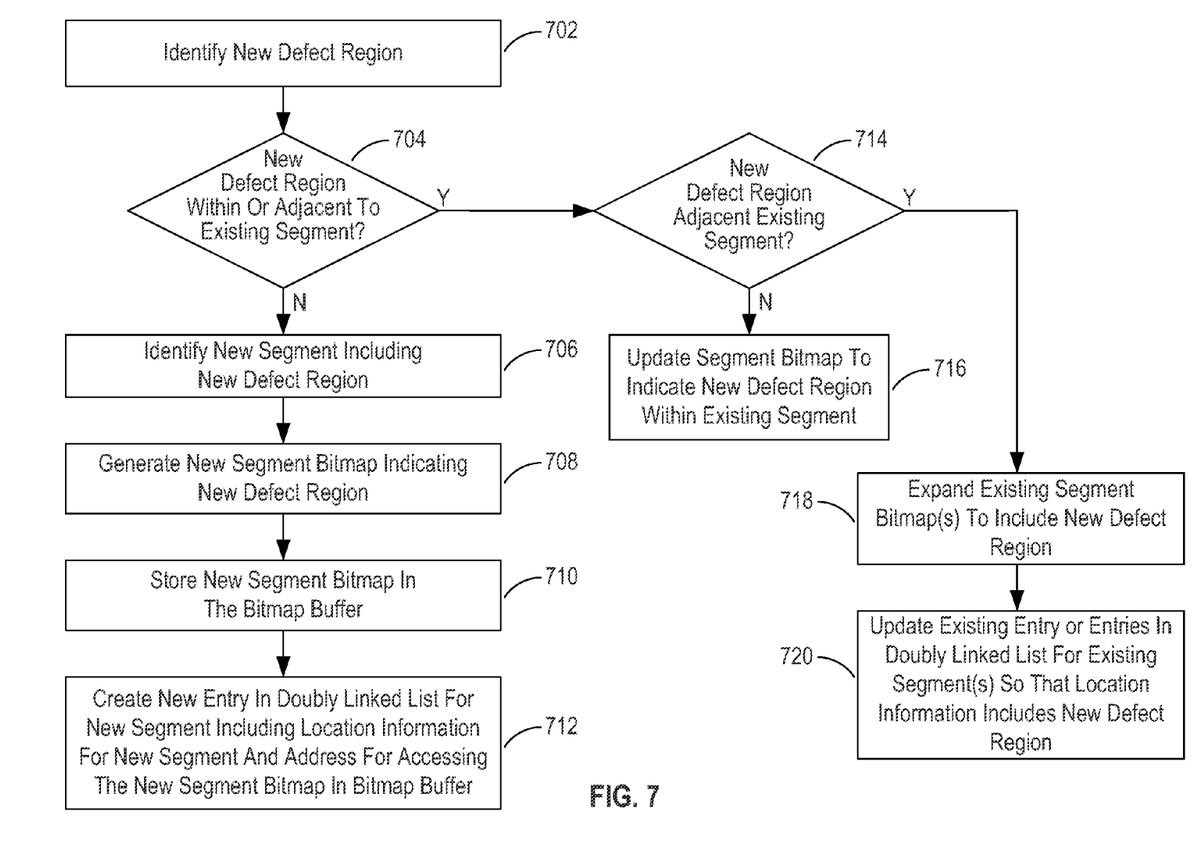
FIG. 7 is a flowchart for a new defect identification process according to an embodiment.

FIG. 7 is a flowchart for a new defect identification process that can be performed by controller 120 executing firmware 14 according to an embodiment. The process of FIG. 7 can be performed after an initial set of segments with defect regions have been identified, and a defect identification process such as the process of FIG. 6 has been performed to generate segment bitmaps and create linked list 18.

In block 702, a new defect region is identified such as through repeated attempts to read or write data in a particular sector or sectors on a disk surface. In block 704, controller 120 determines whether the new defect region is adjacent to or within an existing segment. Controller 120 can use linked list 18 to search for an existing segment that includes the new defect region or is adjacent to the defect region. For example, controller 120 may compare location information for the new defect region such as a head, cylinder, and sector number for the new defect region to location information for the entries of linked list 18.

If it is determined that the new defect region is not within or adjacent to an existing segment, controller 120 identifies a new segment for the new defect region in block 706. A new segment bitmap is generated in block 708 indicating the new defect region. In block 710, controller 120 stores the new segment bitmap in bitmap buffer 16, and in block 712, a new entry is created in linked list 18 for the new segment. The new entry includes location information for locating the new segment such as a head or disk surface number, a reference cylinder or track, a cylinder count, and a wedge count. The new entry also includes an address for accessing the new segment bitmap for the new segment in bitmap buffer 16.

If the new defect region is determined to be within or adjacent to an existing segment in block 704, the process determines whether the new defect region is adjacent to an existing segment. If not, the new defect region is determined to be within an existing segment and controller 120 in block 716 updates an existing segment bitmap to indicate the new defect region within the existing segment. The updating performed in block 716 can include, for example, changing the defect status from "0" to "1" in the existing segment bitmap for sectors or wedge portions in the new defect region.

On the other hand, if it is determined that the new defect region is adjacent to an existing segment in block 714, controller 120 in block 718 expands one or more existing segment bitmaps to include the new defect region. In more detail, if the new defect region is determined to be within a particular resolution for a segment size such as within an adjacent track, sector, or wedge portion, the size of the existing segment bitmap is expanded to include the adjacent track, sector, or wedge portion including the new defect region. In some cases, the expansion of the existing segment bitmap can result in the merging of two existing segment bitmaps into a single larger segment covering both of the existing segments. This can occur when the new defect region is adjacent to two existing segments.

In block 720, controller 120 updates the existing entries or entry in linked list 18 so that the location information for the updated entry includes the new defect region. This can include, for example, increasing the cylinder and wedge counts in the entry to indicate a larger size for the segment. In another example, the reference cylinder may be decreased to include a defect region adjacent to a beginning of the existing segment. In the case where the new defect region is adjacent to two existing segments, the two entries for the existing segments can be combined into one entry for the new larger segment including the old segments and the new defect region between them.

By allowing for the expansion and merging of segment bitmaps and entries, it is ordinarily possible to use less segment bitmaps in bitmap buffer 16 and less entries in linked list 18 as new defect regions are discovered.

Figure 8:
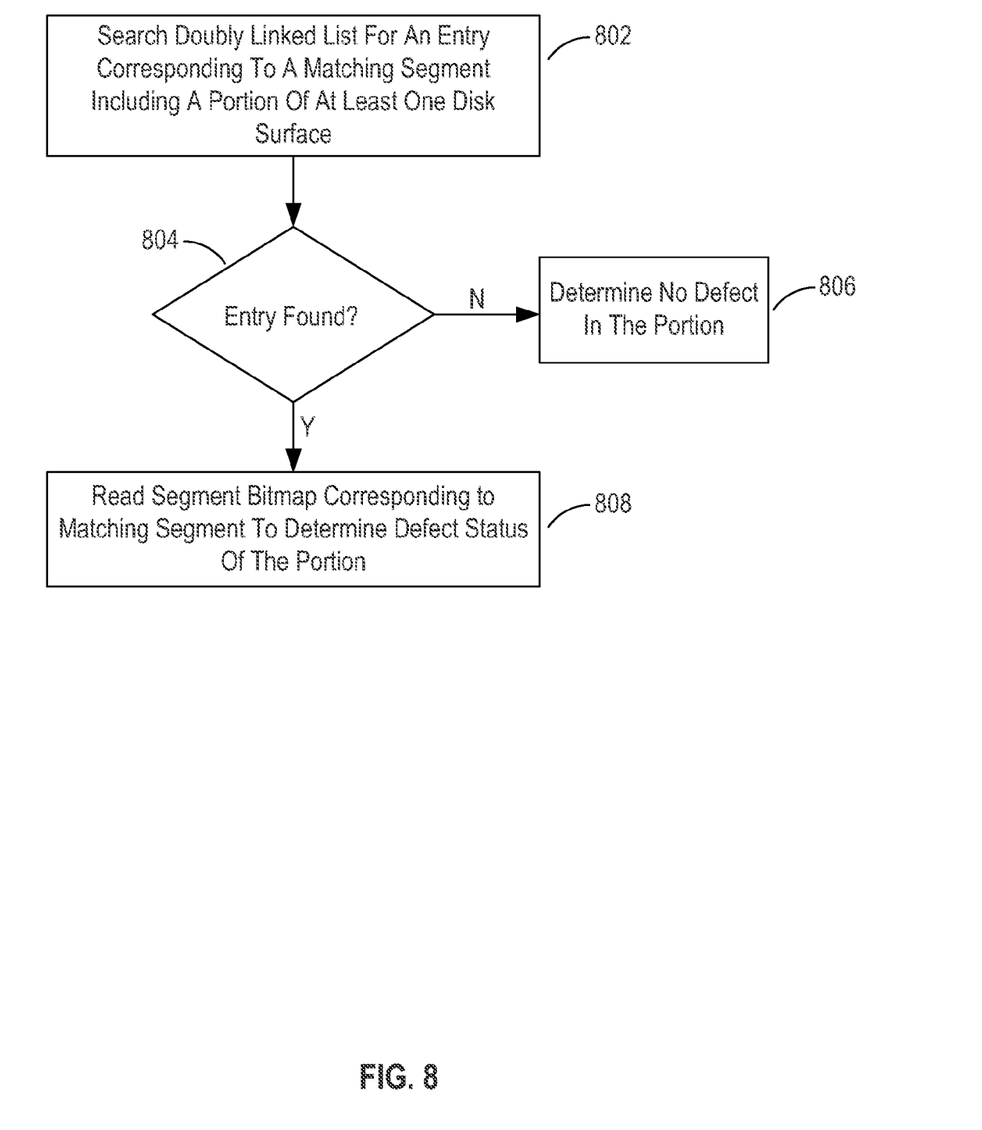
FIG. 8 is a flowchart for a defect status process for determining a defect status of a portion of a disk surface according to an embodiment.

FIG. 8 is a flowchart for a defect status process for determining a defect status of a portion of a disk surface according to an embodiment. The process of FIG. 8 can be performed by controller 120 executing firmware 14.

In some cases, controller 120 may check a defect status of a particular portion of a disk as a background activity to identify segments of a disk surface that are suspected to have a defect region. In one example, controller 120 may look for segments having a defect region that are located the same radial or circumferential location as another segment with a defect region that has already been identified on a different disk surface. In this regard, some defects may have a pattern where each disk surface in a disk pack will have a defect region at the same radial or circumferential location. In such cases, controller 120 can identify such segments using linked list 18 instead of discovering them through write errors or read errors that occur while trying to perform a read or write operation in the defect region. This can ordinarily improve performance by not having to waste time with performing multiple read or write retries or performing other error recovery operations. In addition, controller 120 may attempt to find segments with defect regions on the same disk surface as a previously identified segment based on a defect pattern such as a spiral defect pattern or a diagonal defect pattern that might be caused by a scratch on the disk surface.

The defect status process of FIG. 8 can also be used by controller 120 as part of a process for handling a new defect region as in FIG. 7 where linked list 18 is checked in blocks 704 or 714 to determine whether a new defect region is within or adjacent to an existing segment. If controller 120 is trying to determine if a new defect region is adjacent to an existing segment, the portion of the disk that is checked for a matching segment in linked list 18 may be expanded by a track, sector or wedge portion on both sides of the new defect region to determine if there is an entry for a matching segment that is adjacent to the new defect region.

In the example process of FIG. 8, controller 120 in block 802 searches location information in linked list 18 for an entry corresponding to a matching segment that includes a particular portion of a disk surface. As discussed above, the portion of the disk surface may be suspected to have a defect region based on a defect pattern or the portion may have already been identified as having a defect region and controller 120 is checking to see if the defect region is adjacent or within an existing segment. In the example of linked list 18 shown in FIG. 4, controller 120 may search using a head number and a sector or wedge number for the portion of the disk surface.

If an entry is found in block 804, controller 120 can use the bitmap address provided in the matching entry to read a segment bitmap in block 808 for the matching segment. The segment bitmap can indicate whether the particular portion (e.g., one or more sectors or wedge portions) within the matching segment has been identified as having a defect.

If no entry is found in block 804, controller 120 determines in block 806 that there is no defect in the portion since a segment including the portion has not been previously identified. In the case where controller 120 is checking linked list 18 to determine if a new defect region is within or adjacent an existing segment, controller 120 may then identify a new segment for the new defect region, generate a new segment bitmap, and create a new entry in linked list 18. In the case where controller 120 is looking for a new defect region based on a defect pattern, controller 120 in block 806 may determine that there is not a defect pattern or that the defect pattern has not reached a particular disk surface.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   at least one disk surface for storing data;
   a memory for storing a bitmap buffer; and
   a controller configured to:
   identify a plurality of segments on the at least one disk surface with each segment including at least one defect region;
   generate a segment bitmap for each of the plurality of segments indicating the at least one defect region within the segment;
   store the generated segment bitmaps for the plurality of segments in the bitmap buffer; and
   create a linked list with a plurality of entries corresponding to the plurality of segments, wherein each entry of the plurality of entries includes location information for a segment of the plurality of segments indicating a location of the segment on the at least one disk surface and an address for accessing a segment bitmap for the segment in the bitmap buffer.

2. The DSD of claim 1, wherein the controller is further configured to:
   identify a new defect region during operation of the DSD;
   determine whether the new defect region is within an existing segment of the plurality of segments; and
   if the new defect region is within the existing segment, update the segment bitmap for the existing segment to indicate the new defect region within the existing segment.

3. The DSD of claim 1, wherein the controller is further configured to:
   identify a new defect region during operation of the DSD;
   determine whether the new defect region is within or adjacent to an existing segment of the plurality of segments on the at least one disk surface; and
   if the new defect region is not within or adjacent to an existing segment of the plurality of segments:
   identify a new segment including the new defect region;
   generate a new segment bitmap indicating the new defect region within the new segment;
   store the new segment bitmap in the bitmap buffer; and
   create a new entry in the linked list for the new segment including location information for the new segment indicating a location of the new segment on the at least one disk surface and an address for accessing the new segment bitmap in the bitmap buffer.

4. The DSD of claim 1, wherein the controller is further configured to:
   identify a new defect region during operation of the DSD;
   determine whether the new defect region is adjacent to an existing segment of the plurality of segments on the at least one disk surface; and
   if the new defect region is adjacent to an existing segment:
   expand a segment bitmap for the existing segment to indicate the new defect region; and
   update an existing entry in the linked list for the existing segment so that the location information for the existing segment indicates a location on the at least one disk surface that includes the new defect region.

5. The DSD of claim 1, wherein the controller is further configured to:
   identify a new defect region during operation of the DSD; and
   use the linked list to determine whether the new defect region is within or adjacent to an existing segment of the plurality of segments.

6. The DSD of claim 1, wherein the at least one disk surface includes a plurality of disk surfaces that are circumferentially aligned with each other, and wherein the controller is further configured to use the linked list to identify segments of the plurality of segments that are on different disk surfaces of the plurality of disk surfaces and are located at the same radial or circumferential location.

7. The DSD of claim 1, wherein the controller is further configured to use the linked list to identify a defect pattern on a disk surface of the plurality of disk surfaces.

8. The DSD of claim 1, wherein the controller is further configured to determine a defect status for a portion of the at least one disk surface by searching the linked list for an entry corresponding to a matching segment including the portion of the at least one disk surface.

9. The DSD of claim 8, wherein if an entry corresponding to the matching segment is found in the linked list, the controller is further configured to read a corresponding segment bitmap for the matching segment in the bitmap buffer to determine the defect status for the portion of the at least one disk surface.

10. The DSD of claim 1, wherein the at least one disk surface includes a plurality of tracks for storing data in sectors in each track of the plurality of tracks, and wherein the segment bitmap indicates whether each sector in the segment has a defect.

11. The DSD of claim 1, wherein the at least one disk surface includes a plurality of tracks for storing data and a plurality of servo wedges along the plurality of tracks to indicate a position on a disk surface of the at least one disk surface, and wherein the segment bitmap indicates whether a portion of a track between two servo wedges in the segment has a defect.

12. A method for operating a Data Storage Device (DSD) including at least one disk surface for storing data and a memory for storing a bitmap buffer, the method comprising:
   identifying a plurality of segments on the at least one disk surface with each segment including at least one defect region;
   generating a segment bitmap for each of the plurality of segments indicating the at least one defect region within the segment;
   storing the generated segment bitmaps for the plurality of segments in the bitmap buffer; and
   creating a linked list with a plurality of entries corresponding to the plurality of segments, wherein each entry of the plurality of entries includes location information for a segment of the plurality of segments indicating a location of the segment on the at least one disk surface and an address for accessing a segment bitmap for the segment in the bitmap buffer.

13. The method of claim 12, further comprising:
   identifying a new defect region during operation of the DSD;
   determining whether the new defect region is within an existing segment of the plurality of segments; and
   if the new defect region is within the existing segment, updating the segment bitmap to indicate the new defect region within the existing segment.

14. The method of claim 12, further comprising:
   identifying a new defect region during operation of the DSD;

determining whether the new defect region is within or adjacent to an existing segment of the plurality of segments on the at least one disk surface; and if the new defect region is not within or adjacent to an existing segment of the plurality of segments:
identifying a new segment including the new defect region;
generating a new segment bitmap indicating the new defect region within the new segment;
storing the new segment bitmap in the bitmap buffer; and
creating a new entry in the linked list for the new segment including location information for the new segment indicating a location of the new segment on the at least one disk surface and an address for accessing the new segment bitmap in the bitmap buffer.

15. The method of claim 12, further comprising:
identifying a new defect region during operation of the DSD;
determining whether the new defect region is adjacent to an existing segment of the plurality of segments on the at least one disk surface; and
if the new defect region is adjacent to an existing segment:
expanding a segment bitmap for the existing segment to indicate the new defect region; and
updating an existing entry in the linked list for the existing segment so that the location information for the existing segment indicates a location on the at least one disk surface that includes the new defect region.

16. The method of claim 12, further comprising:
identifying a new defect region during operation of the DSD; and
using the linked list to determine whether the new defect region is within or adjacent to an existing segment of the plurality of segments.

17. The method of claim 12, wherein the at least one disk surface includes a plurality of disk surfaces that are circumferentially aligned with each other, and wherein the method further comprises using the linked list to identify segments of the plurality of segments that are on different disk surfaces of the plurality of disk surfaces and are located at the same radial or circumferential location.

18. The method of claim 12, further comprising using the linked list to identify a defect pattern on a disk surface of the plurality of disk surfaces.

19. The method of claim 12, further comprising determining a defect status for a portion of the at least one disk surface by searching the linked list for an entry corresponding to a matching segment including the portion of the at least one disk surface.

20. The method of claim 19, wherein if an entry corresponding to the matching segment is found in the linked list, the method further comprises reading a corresponding segment bitmap for the matching segment in the bitmap buffer to determine the defect status for the portion of the at least one disk surface.

21. The method of claim 12, wherein the at least one disk surface includes a plurality of tracks for storing data in sectors in each track of the plurality of tracks, and wherein the segment bitmap indicates whether each sector in the segment has a defect.

22. The method of claim 12, wherein the at least one disk surface includes a plurality of tracks for storing data and a plurality of servo wedges along the plurality of tracks to indicate a position on a disk surface of the at least one disk surface, and wherein the segment bitmap indicates whether a portion of a track between two servo wedges in the segment has a defect.

23. A non-transitory computer readable medium storing computer executable instructions for operating a Data Storage Device (DSD) including at least one disk surface for storing data and a memory for storing a bitmap buffer, wherein when the computer executable instructions are executed by a controller of the DSD, the computer executable instructions cause the controller to:
identify a plurality of segments on the at least one disk surface with each segment including at least one defect region;
generate a segment bitmap for each of the plurality of segments indicating the at least one defect region within the segment; and
store the generated segment bitmaps for the plurality of segments in the bitmap buffer; and
create a linked list with a plurality of entries corresponding to the plurality of segments, wherein each entry of the plurality of entries includes location information for a segment of the plurality of segments indicating a location of the segment on the at least one disk surface and an address for accessing a segment bitmap for the segment in the bitmap buffer.

* * * * *